July 21, 1936.   A. A. GRAHAM   2,048,333
PIPE NIPPLE CHUCK
Filed Jan. 12, 1935
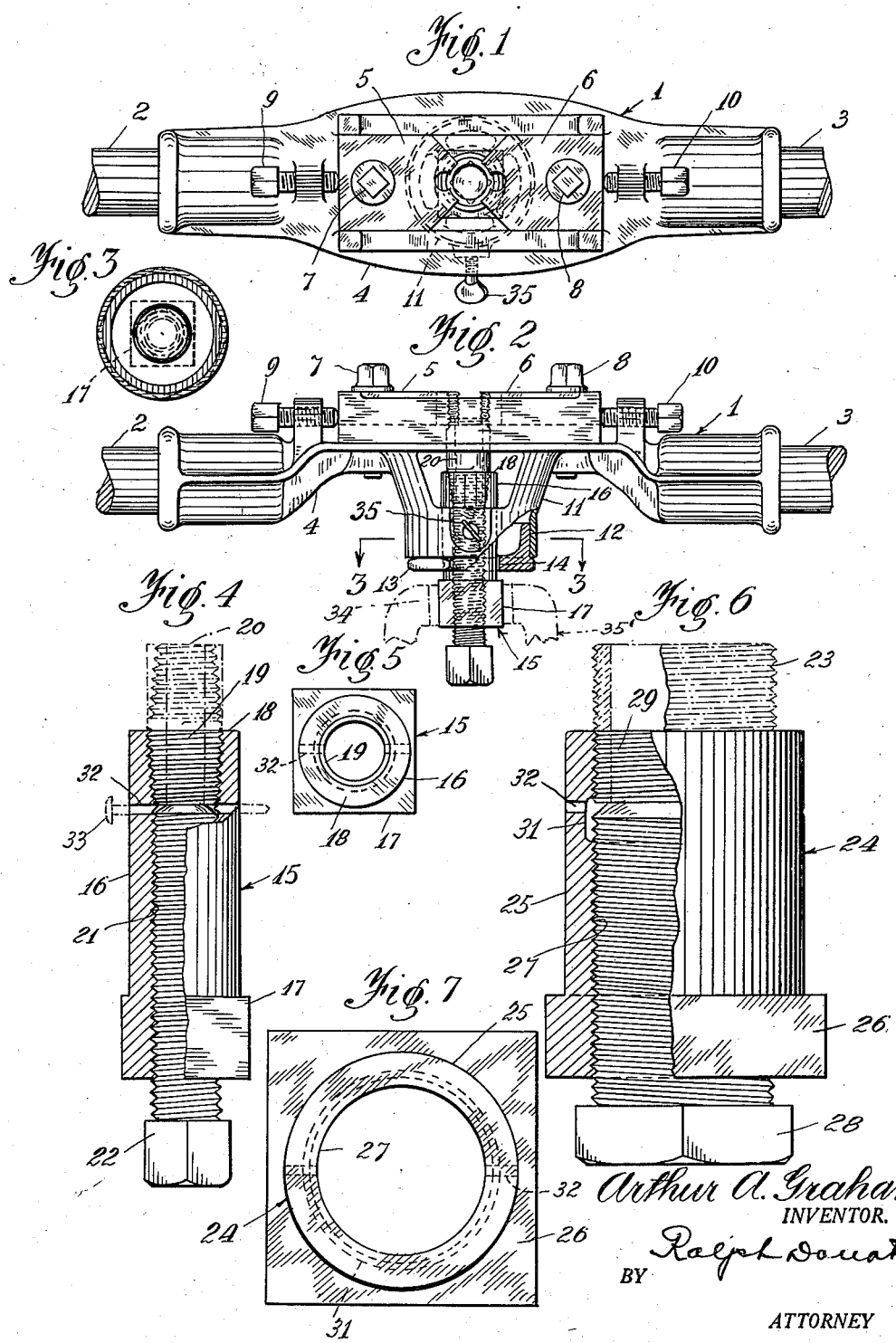
Arthur A. Graham
INVENTOR.
BY Ralph Donath
ATTORNEY Patented July 21, 1936

2,048,333

UNITED STATES PATENT OFFICE 2,048,333

PIPE NIPPLE CHUCK

Arthur A. Graham, Pittsburgh, Pa.

Application January 12, 1935, Serial No. 1,512

1 Claim. (Cl. 279—7)

This invention relates to a nipple chuck which is adapted to firmly hold the threaded end of an unfinished pipe nipple while cutting threads on the other end thereof. An ordinary die stock being used in connection with my pipe chuck.

Heretofore, to produce pipe nipples, a length of pipe of the proper size was securely held between the jaws of a vise and one end thereof suitably threaded by means of a die stock. The so threaded end of the pipe was then cut off to the desired length. To thread the other end of the nipple the previously threaded end was held between the jaws of a vise and then the threads cut on the unthreaded end.

This method of making nipples often caused the threads to be damaged by the jaws of the vise and also often produced nipples with the threads out of alignment for the reason that the die stock could not be properly guided while cutting the thread.

One of the objects of my invention is to provide a device which securely holds the nipple while threading without damaging the threads thereof.

Another object of my invention is to provide a device in which the finished nipple is easily removed from the chuck.

Yet another object of my invention is to provide a nipple chuck which can be securely held by a vise while cutting the threads thereon and which has provisions for producing threads in absolute alignment.

Still another object of my invention is to provide means which limits the entrance of the threaded end of the nipple in the socket of the chuck.

Still another object of my invention is to provide a device which is very simple in construction and therefore inexpensive to manufacture.

Other objects of my invention will appear incidentally in the course of the following description.

In the accompanying drawing,

Figures 1 and 2 are top and front elevations of a die stock as commonly used by the trade to which my nipple chuck is applied.

Figure 3 is a sectional view along line 3—3 in Figure 2.

Figure 4 is a transverse sectional elevation of the nipple chuck, partly in outline, showing in dot and dash lines a finished short nipple in the socket, ready for removal.

Figure 5 is a top elevation of Figure 4.

Figure 6 is a view similar to Figure 4 showing a finished large close nipple in dot and dash lines.

Figure 7 is a top view of Figure 6.

In the drawing, which illustrates my invention invention I represents a common die stock which is provided with a pair of suitable handles 2 and 3 secured to the body 4 in any suitable manner. Slidably mounted in the die stock I are a pair of cutting dies 5 and 6 which are held in the desired position by means of the bolts 7 and 8, bolts 9 and 10 being used to properly adjust the dies 5 and 6 in a well known manner.

Centrally and directly underneath the die stock body 4 is a depending pipe guide bracket 11, formed integrally with said body 4. This depending bracket 11 is provided with a circular bore 12 into which fits a guide cap 13 which is provided with a central aperture 14 and is held in position by means of a thumb screw 35.

Aperture 14 is sufficiently large to permit entrance of the nipple chuck 15 as best shown in Figures 1 and 2.

The nipple chuck 15 as illustrated in Figures 4 and 5, comprises a longitudinal body 16 of circular cross-section, the lower end of which being provided with an enlarged square shoulder 17 formed integrally with said body 16.

The upper part 18 of said body 16 is provided with a centrally located and suitably threaded pipe socket 19 and is adapted to receive the threaded end of the pipe nipple 20. In alignment with said socket 19 is an internally threaded aperture 21 to receive the bolt 22.

For cutting threads on a large size pipe nipple 23 I provide a chuck 24 which is very similar to the one previously described and which is illustrated in Figures 6 and 7. This chuck may be used for cutting straight threads on pipe nipples or tubes which are used in plumbing fixtures etc., and the same comprises a longitudinal circular body 25 having a square shouldered lower end 26 and is provided with a central and internally threaded aperture 27 to receive the square headed bolt 28.

The upper end of said body 25 is provided with a suitably threaded socket 29 for the reception of the screw-threaded end of the pipe nipple 23. If desired, the bolt-threads 27 may be left hand, but this is not absolutely necessary to obtain good results.

A circular recess 31, as shown in Figures 6 and 7 should be provided when right and left threads are used to assure perfect threads at the junction of the same.

One of the features of my invention is that the finished nipple may be easily removed after the same is threaded and it is not necessary to screw the threaded end of the nipple tight into the socket, as will be understood.

In order to prevent the threaded end of the nipple from being screwed into the socket too tight I provide holes 32 in the body which may be used as peep-holes or if so desired a pin 33 may be inserted through said holes 32, so as to limit the movement of the nipple. Of course the pin must be withdrawn when tightening the bolt against the lower edge of the nipple.

In operation, the nipple chuck is firmly held by the jaws 34 of a vise 35' on two of the sides of the square shoulders of the chuck. The threaded end of the pipe nipple is then screwed into the socket until it reaches the pin. The pin is then withdrawn and the bolt is screwed against the lower edge of the pipe nipple with the fingers or with a wrench. By doing this, the upper portion of the bolt grips the inner edge of the lower part of the pipe nipple and forces the threads of the pipe nipple against the threads of the socket, thus creating friction and preventing the nipple from turning while cutting threads.

A guide cap 13 through which the body of the chuck 15 penetrates serves as a guide with the result of straight threads on the nipple.

Attention is called to the fact that my device may be used for removing studs from machinery, such as crank-cases for automobiles etc. and the operation in that case is as follows:

Assuming, that it is desired to remove a half inch stud from a piece of machinery, I use my device provided with a half inch socket and screw the same on the stud until it reaches the pin 33. After withdrawing the pin, the bolt 22 is tightened against the stud and by using a monkey wrench upon the squared lower end 17 in the opposite direction of the stud-threads, the stud may be readily removed.

If desired, the socket of the pipe nipple chuck could be made separable from the body, so as to be able to use the nipple chuck for various sizes, but this is not necessary, because of the low cost of producing the device.

While I have disclosed herein the embodiment of the invention, it should be understood that the invention is not limited to this disclosure but may be modified and used in different ways to meet varying conditions without departure from the spirit and scope of the invention as hereinafter claimed.

I claim:

A pipe nipple chuck comprising a tubular body internally threaded from its opposite ends, one threaded end portion being adapted to receive a threaded end portion of a nipple and the other threaded end portion being adapted to receive a threaded bolt for clamping a nipple in the body, said body having its walls formed with opposed radially extending openings spaced from ends of the body whereby a pin may be passed diametrically through the body to limit threading of a nipple into the body from the first mentioned end thereof, the walls of the body being also formed with an internal circumferentially extending groove forming a circumferentially extending channel between spaced threaded portions of the walls of the body and having the said openings leading therefrom, and a clamping bolt threaded into the body through the second mentioned end thereof for abutting the inner end of a nipple and exerting pressure thereon to create binding engagement between threads of the body and the nipple and lock the nipple in place.

ARTHUR A. GRAHAM.